United States Patent
Tran et al.

(10) Patent No.: US 11,937,146 B2
(45) Date of Patent: Mar. 19, 2024

(54) HIGH FIDELITY GEOLOCATION USING MACHINE LEARNING

(71) Applicant: T-Mobile USA, Inc., Bellevue, WA (US)

(72) Inventors: Antoine Tran, Bellevue, WA (US); Doru Culiac, Bellevue, WA (US); Jie Hui, Mercer Island, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 88 days.

(21) Appl. No.: 17/322,064

(22) Filed: May 17, 2021

(65) Prior Publication Data
US 2021/0400438 A1    Dec. 23, 2021

Related U.S. Application Data

(60) Provisional application No. 63/040,888, filed on Jun. 18, 2020.

(51) Int. Cl.
*H04W 4/02* (2018.01)
*G06F 18/25* (2023.01)
*H04W 4/029* (2018.01)

(52) U.S. Cl.
CPC ............ *H04W 4/02* (2013.01); *G06F 18/256* (2023.01); *H04W 4/029* (2018.02); *G06F 2218/12* (2023.01)

(58) Field of Classification Search
None
See application file for complete search history.

(56) References Cited

U.S. PATENT DOCUMENTS

| | | | | |
|---|---|---|---|---|
| 2011/0169692 | A1* | 7/2011 | Macfarlane | H04W 4/60 715/760 |
| 2012/0258734 | A1* | 10/2012 | Takahashi | H04W 52/0254 455/456.1 |
| 2015/0330795 | A1* | 11/2015 | Srinivasan | G01S 5/0236 701/522 |
| 2016/0029224 | A1* | 1/2016 | Edge | H04W 24/08 455/456.1 |
| 2019/0007793 | A1* | 1/2019 | Liang | G06N 3/084 |
| 2019/0166574 | A1* | 5/2019 | Abou-Rizk | H04W 16/00 |
| 2020/0213006 | A1* | 7/2020 | Graham | H04B 10/116 |

* cited by examiner

*Primary Examiner* — German Viana Di Prisco (57) ABSTRACT

Techniques are described for filtering location data in a dataset based at least on its representation of the actual location of a user device. In some embodiments, sensor data including location data associated with a user device located in an environment may be used to identify one or more prediction factors. The one or more prediction factors may be associated to embed a user behavior vector of a user based at least on the associations. The user behavior vector may be a representation of an environment class in which the environment may be classified. The location data is associated with the environment class.

17 Claims, 5 Drawing Sheets

HIGH FIDELITY GEOLOCATION USING MACHINE LEARNING

CROSS-REFERENCE TO RELATED PATENT APPLICATION

This application claims priority to U.S. Provisional Patent Application No. 63/040,888, filed on Jun. 18, 2020, and entitled "High Fidelity Geolocation Using Machine Learning," which is hereby incorporated by reference in its entirety.

BACKGROUND

Location accuracy is a critical element in scenarios where location data is being used either to probe the health of telecommunications services at a specific geographic location or as a platform for other services. Thus, location as probe and location as a service has a critical dependency on location accuracy.

Location data may be obtained from a number of user devices in a target geographical area. In some aspects, location data may be crowd-sourced and can include a combination of cached and real-time coordinates. In the latter scenario, real-time coordinates may be delivered immediately or within an expected lag time to a telecommunications service provider from a user device.

By contrast, cached data may be used upon an unsuccessful attempt to retrieve real-time latitude-longitude coordinates. In this case, previously-stored location data may be retrieved and reported to the telecommunications service provider as location coordinates. While cached data may provide some reference to a user device's relative location, cached data may not accurately represent the actual location of a user device. For instance, cached data may become outdated when the user device moves to a different location after the location data is cached. However, not all cached data may represent stale locations. Accordingly, cached data may be analyzed to determine whether the cached data accurately represents the actual locations of user devices.

BRIEF DESCRIPTION OF THE DRAWINGS

The detailed description is described with reference to the accompanying figures, in which the leftmost digit(s) of a reference number identifies the figure in which the reference number first appears. The use of the same reference numbers in different figures indicates similar or identical items.

DETAILED DESCRIPTION

This disclosure is directed to techniques for filtering location datasets to determine an actual location of a user device based at least on the environment classification derived from a user behavior vector that is associated with the user device. In various embodiments, a location server may implement a data interface module that is configured to receive location data from a user device and maintain a location dataset. The location dataset may include cached location data that is associated with the user device. More specifically, the location data may include latitude-longitude coordinates, location age, timestamp, and/or other information related to the user device such as its IP address, MAC address, a mobile or subscriber identifier (e.g., International Mobile Subscriber Identity (IMSI)), etc.

To determine whether the location data in the dataset is representative of the actual or true location of the user device, the location data may be forwarded to a machine learning module of the location server. The machine learning module may be configured to perform training functions to classify an environment in which the user device is located, based at least on location data. In one example, environment classes may include an indoor location, an outdoor location, a rural environment, an urban environment, and/or so forth. In some aspects, the machine learning module may perform feature engineering using various filter methods (e.g., Pearson's correlation, Linear Discriminant Analysis (LDA), Analysis of Variance (ANOVA), Chi-Square, etc.), wrapper methods (e.g., forward selection, backward elimination, recursive feature elimination), and/or embedded methods, to identify different types of location data, or prediction factors, and create associations among the one or more prediction factors. The associations may correspond with a user behavior vector, which may be a latent representation of a particular environment class.

The machine learning module may apply a trained machine learning model to the user behavior vector to determine the type of environment (i.e., environment class) in which the user device is located. In various embodiments, a probability value for whether the user device is located in a particular environment that is associated with a particular environment class may be calculated using the machine learning model. Upon determining the environment class, the machine learning module may associate the environment class with the location data.

Based at least on the selected environment class, the machine learning module may generate a filtering value using a machine learning algorithm belonging to the reinforcement learning class that implements a reward and penalty scheme. In one aspect, the machine learning module of the location server may process a number of data points as a reward and determine a penalty based on the distance between the location based on the location data and the actual location of the user device. The filtering values allow for the removal of false location data from a given dataset for locations. Accordingly, if the location data corresponds to a location that is within a predetermined distance of the actual location of the user device, then the location data is retained in the dataset. Conversely, if the location data corresponds to a location that is more than a predetermined distance away from the actual location of the user device, the location data is removed from the dataset.

Additionally, the location server may include a service selection module for providing one or more telecommunications service offerings based at least on the location of the user device and monitoring the usage of the telecommunications network resources. In some examples, the service selection module may be configured to manage rate limiting criteria for the user device, and/or allocate network bandwidth or rate limit traffic associated with the user device, which may result in affecting the quality of service (QoS) for the user device.

The techniques described herein may be implemented in a number of ways. Example implementations are provided below with reference to the following figures.

Example Network Architecture

Figure 1:
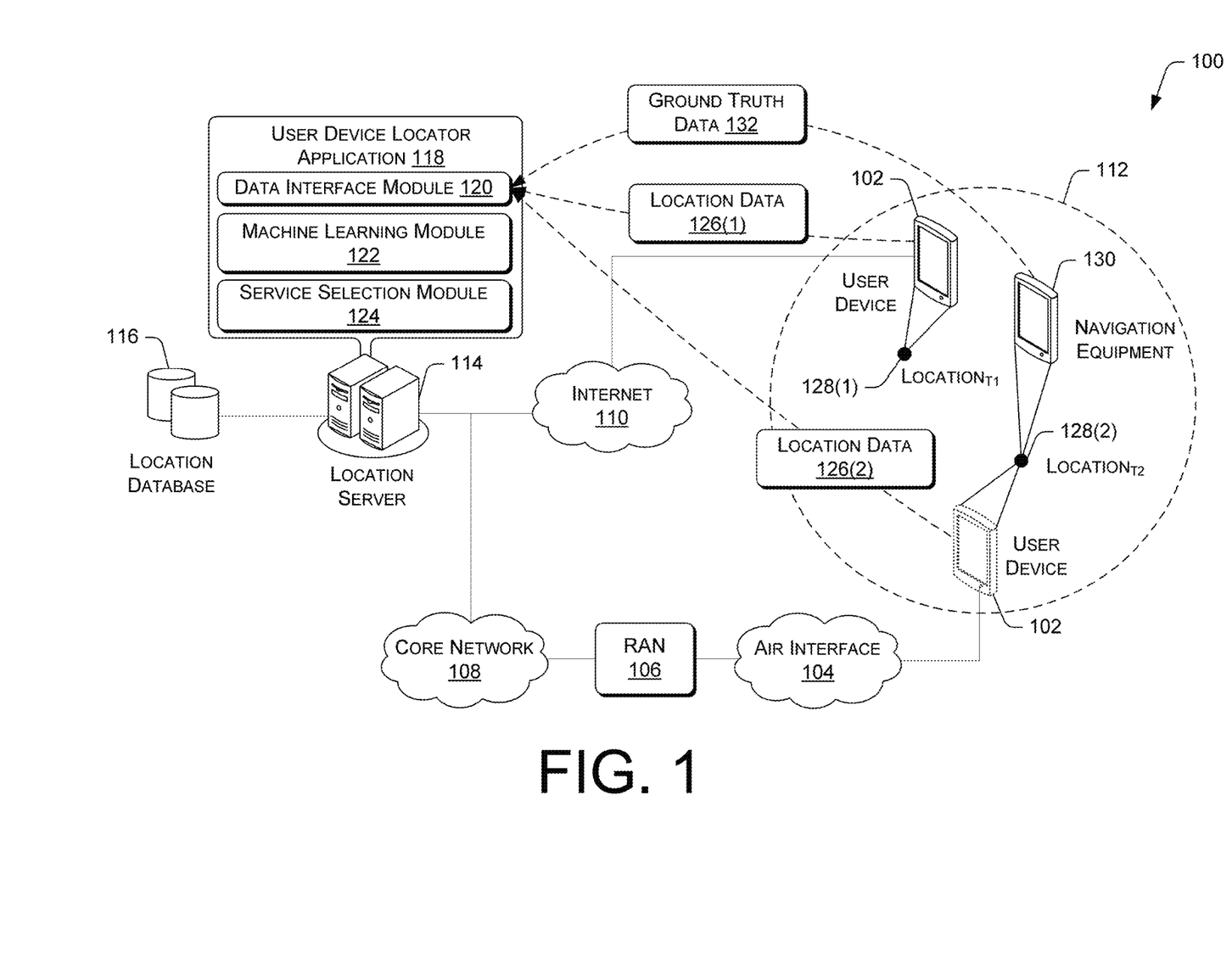
FIG. 1 illustrates an example of a network architecture for filtering location datasets based at least on the environment classification derived from a user behavior vector that is associated with the user device.

FIG. 1 illustrates an example of a network architecture for filtering location datasets based at least on the environment classification derived from a user behavior vector that is associated with the user device. The network 100 includes at least one user device 102. The user devices 102 may be smartphones, mobile devices, personal digital assistants (PDAs), or other electronic devices having a wireless communication function, that are capable of receiving input, processing the input, and generating output data.

The user device 102 is configured to communicate with the network 100 via an access network over a physical communications interface or layer, shown in FIG. 1 as air interfaces 104 and/or a direct-wired connection. The air interface 104 can comply with a given cellular communications protocol (e.g., CDMA, EVDO, eHRPD, GSM, EDGE, W-CDMA, LTE, etc.). In other embodiments, an additional air interface can comply with a wireless Internet Protocol (e.g., Wi-Fi, IEEE 802.11). The access network may comprise a RAN 106 which includes a plurality of access points that serve user devices over air interfaces, such as the air interface 104. The access points in the RAN 106 can be referred to as access nodes (ANs), access points (APs), and base stations (BSs, Node Bs, eNode Bs, gNb, etc.). These access points can be terrestrial access points (or ground stations), or satellite access points.

The RAN 106 is configured to connect to a core network 108 that can perform a variety of functions and support one or more communication services, including bridging circuit-switched (CS) calls between user devices served by the RAN 106 and other user devices served by a different RAN, and can also mediate an exchange of packet-switched (PS) data with external networks such as Internet 110. The Internet 110 includes a number of routing agents and processing agents (not shown). In FIG. 1, the user device 102 is shown as connecting to the Internet 110 directly (i.e., separate from the core network 108, such as over an Ethernet connection of a Wi-Fi or an 802.11-based network). The Internet 110 can thereby function to bridge packet-switched data communications between the user device 102 via the core network 108.

The user device 102 may operate in various types of environments 112 (i.e., environment class). For example, the user device 102 may operate in commercial or residential indoor and outdoor environments and may travel between urban, suburban, rural areas, and/or so forth. The user device 102 may report its device information (e.g., user device identifier, usage information, etc.) and location information (e.g. GPS coordinates) to a location server 114. The user device 102 may report to the location server 114 on a scheduled basis or in response to receiving a query from the location server 114. Over time, however, the location of the user device 102 may change. Accordingly, the last reported location of the user device 102 may not be the actual location of the user device 102.

The location information of the user device 102 may be stored in the location database 116. The location database 116 can comprise a data management layer that includes software utilities for facilitating the acquisition, processing, storing, reporting, and analysis of data from multiple data sources such as the user device 102 and the navigation equipment 130. In various embodiments, the location database 116 can interface with an API for providing data access.

The location server 114 is configured to support location dataset filtering functions to locate the user device 102 based at least on environment classifications. The location server 114 may include general-purpose computers, such as desktop computers, tablet computers, laptop computers, servers (e.g., on-premise servers), or other electronic devices that are capable of receiving input, processing the input, and generating output data. The location server 114 may be operated by the telecommunications service provider or a third-party entity that is working with the telecommunications service provider. The location server 114 may store data in a distributed storage system, in which data may be stored for long periods of time and replicated to guarantee reliability.

Accordingly, the location server 114 may provide data and processing redundancy, in which data processing and data storage may be scaled in response to demand. Further, in a networked deployment, new location servers may be added. Thus, the location server 114 can include a plurality of physical machines that may be grouped together and presented as a single computing system. Each physical machine of the plurality of physical machines may comprise a node in a cluster. The location server 114 may also be in the form of virtual machines, such as virtual engines (VE) and virtual private servers (VPS).

The location server may include a user device locator application 118. The user device locator application 118 may be executable via one or more hardware, software, or communication environments, each of which enables the location server 114 to filter the received location dataset via a trained machine learning model to retain location data in the dataset that is representative of the actual or true location of the user device 102. In FIG. 1, the user device locator application 118 may include a data interface module 120, the machine learning module 122, and the service selection module 124. Generally, the data interface module 120 may be configured to retrieve location data (e.g., latitude-longitude coordinates) and related data (e.g., location age, timestamp, sensor data) from various data sources such as the user device 102. In some aspects, the data interface module 120 may include a collection component that implements a scheduler for periodically checking and retrieving newly available data. Accordingly, the data interface module 120 may receive location data 126(1) when the user device 102 is at a first location at $T_1$ (i.e., location$_{T1}$ 128(1)) and additional location data 126(2) when the user device 102 is at a second location at $T_2$ (i.e., location$_{T2}$ 128(2)).

In some aspects, the location server 114 may conduct location calibration. For example, the data interface module 120 may collect ground truth data or calibration data from navigation equipment 130. In various embodiments, the navigation equipment 130 may also be configured to collect survey data, test data, and/or so forth. The navigation equipment 130 may be handheld devices such as smartphones, mobile devices, personal digital assistants (PDAs), and/or other electronic devices having a wireless communication function, that are capable of receiving input, processing the input, and generating output data as depicted in FIG. 1. However, in other embodiments, the navigation equipment 130 may be various computing devices such as a laptop or a tablet computer, which may be deployed via robots and/or vehicles such as unmanned aerial vehicles (UAVs), unmanned ground vehicles (UGVs), and/or so forth. Depending upon embodiments, the navigation equipment 130 may be equipped with various environmental sensors. The navigation equipment 130 may be equipped with various geographic information systems such as GIS, GPS, and GNSS, as well as other types of tracking systems, speed and distance log devices, and/or environmental sensors for locating people or objects.

The location data 126(1) and 126(2) may include a set of estimated location coordinates. In FIG. 1, the navigation equipment 130 and the user device 102 are both located at location$_{T2}$ 128(2). In various embodiments, the navigation equipment 130 and the user device 102 may be located at substantially identical location. For instance, the navigation equipment 130 and the user device 102 may be located within a predetermined distance or within an acceptable range from each other. The ground truth data 132 being estimated via the navigation equipment 130 by the location coordinates provided by the user device 102 is the actual location. The accuracy of the estimate is the maximum distance between the location coordinates as provided by the user device 102 and the ground truth data 132. The location server 114 may determine whether the offset based at least on the maximum distance between the location coordinates and the ground truth data 132 is within specification to conduct calibration. The determination of the offset value to update the parameters of localization is generally referred to as calibration.

The machine learning module 122 may be configured to train machine learning models to classify an environment in which the user device 102 is located to filter a location dataset. In this regard, the machine learning module 122 may include a training component to create and train machine learning models on the environment classes using a selected machine learning algorithm and training data for individual environment classes. Different classification schemes (explicitly and/or implicitly trained) and/or systems may be employed by the machine learning module 122 for the generation of the machine learning model. For example, XGBoost (decision forest) and Custom Deep Artificial Neural Network (DANN) using a TensorFlow backend and Keras (Python libraries) may be applied.

Classification can comprise creating environment labels or classes. Individual environment classes may be associated with a specific type of environment such as commercial or residential indoor and outdoor environments, urban, suburban, rural environments, and/or so forth. A latent representation of a particular environment class may be a user behavior vector. The user behavior vector may correspond to associations of prediction factors derived from location data 126(1) and 126(2) and related data. In one example, the user behavior vector may be derived from associations among prediction factors that are based on the sensor data collected via the user device 102. In some aspects, the machine learning module 122 may perform feature engineering using various filter methods (e.g., Pearson's correlation, Linear Discriminant Analysis (LDA), Analysis of Variance (ANOVA), Chi-Square, etc.), wrapper methods (e.g., forward selection, backward elimination, recursive feature elimination), and/or embedded methods.

The user device 102 may be equipped with various sensors, which may obtain sensor data that may be used to identify behavior patterns and infer certain user behaviors. For example, speed data obtained from the accelerometer of the user device 102 may indicate that the user device 102 is traveling in a vehicle in an outdoor environment. Accordingly, based on the speed data, the machine learning module 122 may infer that the user of the user device 102 is driving. In another example, information from multiple sensors such as a red, green, blue (RGB) light sensor, a proximity sensor, a light intensity sensor, and/or a Wi-Fi radio may indicate that the user device 102 is substantially stationary in one place for an extended period of time during work hours on a weekday. This may indicate that the user of the user device 102 is located at a workplace, such as a commercial office building.

The machine learning module 122 may apply a machine learning model to a behavior pattern of the user device 102 to determine the type of environment (i.e., environment class) in which the user device 102 is located. In various embodiments, a probability value for whether the user device 102 is located in a particular environment that is associated with an environment class may be calculated using the machine learning model. Subsequently, the location server 114 may determine that the user device 102 is located in a particular environment that is associated with an environment class when the probability value exceeds a probability threshold.

Based at least on the selected environment class, the machine learning module 122 may generate a filtering value using a reinforcement machine learning algorithm that implements a reward and penalty scheme. In one aspect, the machine learning module of the location server may process a number of data points as a reward and determine a penalty based on the distance between the location based on the location data and the actual location of the user device 102. The filtering values allow for the removal of false location data from a given dataset for locations.

Accordingly, in reinforcement learning, the machine learning module 122 may optimize its behavior to maximize the rewards and minimize penalties. More specifically, rewards increase the closer the location (i.e., based on the location data in a dataset) is to the actual location of the user device 102. Conversely, penalties increase the further the location (i.e., based on the location data in a dataset) is from the actual location of the user device 102. Additionally, if the location in a dataset is within a predetermined distance of the actual location of the user device 102, then the location data for the location is retained in the dataset. Conversely, if the location in a dataset is more than a predetermined distance away from the actual location of the user device 102, the location data for the dataset is removed from the dataset.

In FIG. 1, the user device 102 may report location data 126(1) at location$_{T1}$ 128(1) to the location server 114. The location data 126(1) may be cached at the location server 114 or stored in the location database 116. Based on the location data 126(1) and related data, the location server 114, via the machine learning module 122, may determine the environment class at location$_{T1}$. The user device 102 may subsequently move to a different location, such as location$_{T2}$ 128(2). Accordingly, the actual location of the user device 102 is location$_{T2}$ 128(2). The location server 114 may receive a request to locate the user device 102. To determine whether the location data 126(1) in the dataset is representative of the actual location of the user device 102, the machine learning module 122 may apply a filtering value based at least on the environment class at location$_{T1}$. Based at least on the filtering value, the location server 114 may remove the location data 126(1) from the given dataset. For instance, if the location server 114, via the machine learning module 122, determines that the distance between location$_{T1}$ 128(1) and location$_{T2}$ 128(2) is above a predetermined threshold based at least on the filtering value, the location data 126(1) is removed from the dataset at the location server 114 and/or the location database 116.

The service selection module 124 may be configured to provide telecommunications service offerings, manage rate limiting criteria for the user device, and/or allocate network bandwidth or rate limit traffic associated with the user device. Accordingly, the service selection module 124 may modify telecommunications network resources allocated to the user device to effect different QoS and monitor the usage of the telecommunications network resources. In one aspect, the service selection module 124 may be configured to make determinations for offering or limiting services and QoS based at least on the location data 126(1) and 126(2). Additionally, the service selection module 124 may be configured to send a notification to the user device 102 when the network 100 changes the QoS or a change in QoS is available.

Example Computing Device Components

Figure 2:
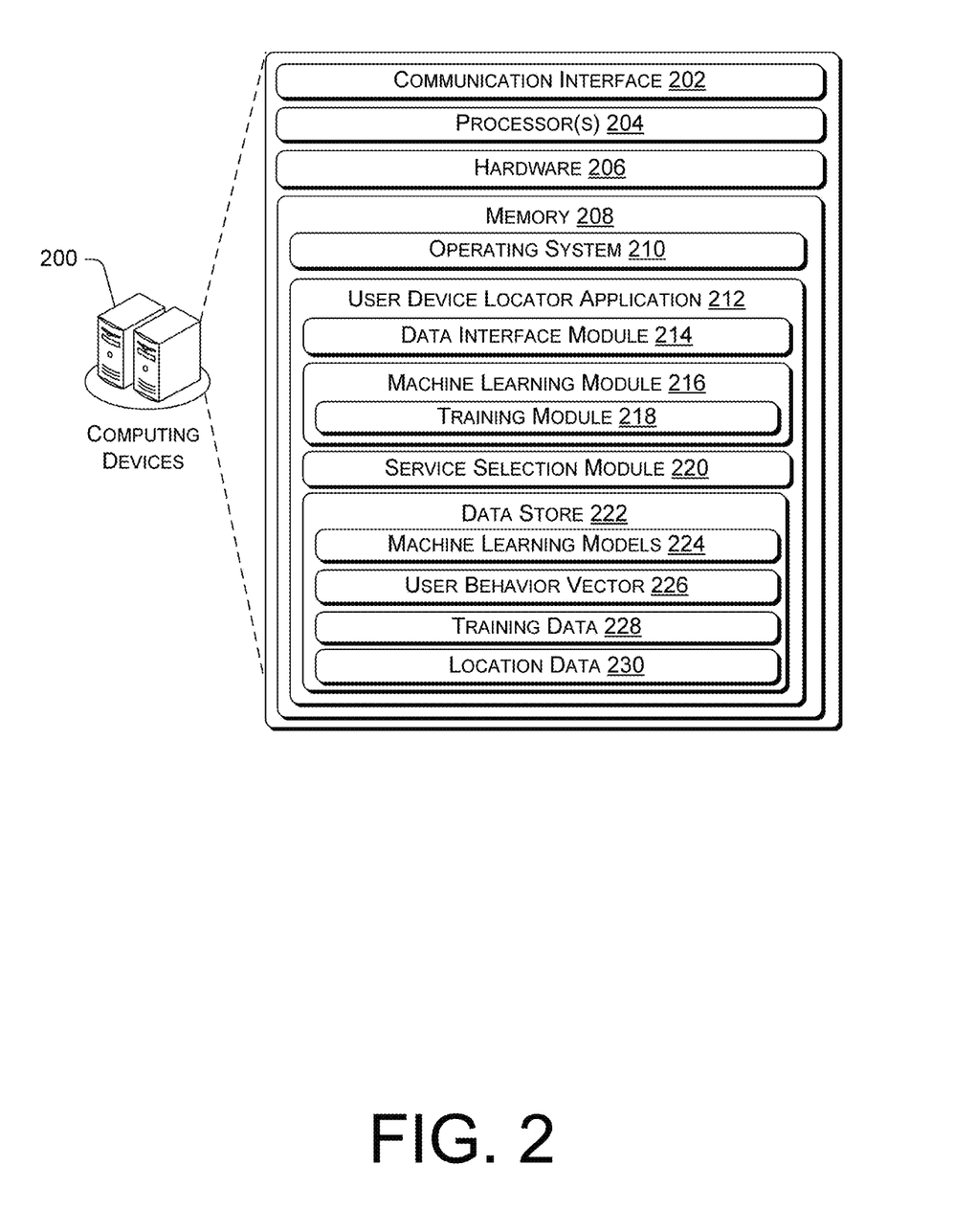
FIG. 2 is a block diagram showing various components of an illustrative computing device that performs location dataset filtering based at least on an environment class identified using a trained machine learning model.

FIG. 2 is a block diagram showing various components of an illustrative computing device, wherein the computing device can comprise a location server 200. It is noted that the location server 200 as described herein can operate with more or fewer of the components shown herein. Additionally, the location server 200 as shown herein or portions thereof can serve as a representation of one or more of the computing devices of the present system.

The location server 200 may include a communication interface 202, one or more processors 204, hardware 206, and memory 208. The communication interface 202 may include wireless and/or wired communication components that enable the location server 200 to transmit data to and receive data from other networked devices. In at least one example, the one or more processor(s) 204 may be a central processing unit(s) (CPU), graphics processing unit(s) (GPU), both a CPU and GPU or any other sort of processing unit(s). Each of the one or more processor(s) 204 may have numerous arithmetic logic units (ALUs) that perform arithmetic and logical operations as well as one or more control units (CUs) that extract instructions and stored content from processor cache memory, and then execute these instructions by calling on the ALUs, as necessary during program execution.

The one or more processor(s) 204 may also be responsible for executing all computer applications stored in the memory, which can be associated with common types of volatile (RAM) and/or nonvolatile (ROM) memory. The hardware 206 may include an additional user interface, data communication, or data storage hardware. For example, the user interfaces may include a data output device (e.g., visual display, audio speakers), and one or more data input devices. The data input devices may include but are not limited to, combinations of one or more keypads, keyboards, mouse devices, touch screens that accept gestures, microphones, voice or speech recognition devices, and any other suitable devices.

The memory 208 may be implemented using computer-readable media, such as computer storage media. Computer-readable media includes, at least, two types of computer-readable media, namely computer storage media and communications media. Computer storage media includes volatile and nonvolatile, removable, and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. The memory 208 may also include a firewall. In some embodiments, the firewall may be implemented as hardware 206 in the location server 200.

The processor(s) 204 and the memory 208 of the location server 200 may implement an operating system 210 and a user device locator application 212. The user device locator application 212 may include a data interface module 214, a machine learning module 216, and/or a location service module 220. The operating system 210 may include components that enable the location server 200 to receive and transmit data via various interfaces (e.g., user controls, communication interface, and/or memory input/output devices), as well as process data using the processor(s) 204 to generate output. The operating system 210 may include a presentation component that presents the output (e.g., display the data on an electronic display, store the data in memory, transmit the data to another electronic device, etc.). Additionally, the operating system 210 may include other components that perform various additional functions generally associated with an operating system.

The data interface module 214, the machine learning module 216, and the service selection module 220 may include routines, program instructions, objects, and/or data structures that perform particular tasks or implement particular abstract data types. For example, the data interface module 214 may include one or more instructions which, when executed by one or more processors 204, direct the computing devices 200 to perform operations related to retrieving location data 230 from various data sources. In various embodiments, the data interface module 214 may retrieve ground truth data and/or related data from data sources such as navigation equipment and user devices.

The data interface module 214 may implement data collection, data storage, and/or data access components. In some aspects, the data collection component may be a scheduler that periodically checks for and retrieves newly available data from multiple data sources such as user devices and navigation equipment. The scheduler may perform the checking and retrieval based on configurable policies. For example, a configurable policy may specify the source data location, frequency of data retrieval, data retention period, and data disposal following the expiration of the data retention period. The location data 230 may be stored in the data store 222. The data store 222 can comprise a data management layer that includes software utilities for facilitating the acquisition, processing, storing, reporting, and analysis of data from multiple data sources.

In various embodiments, the data interface module may employ data adapters to obtain data files from the data sources. The data adapters may use file transfer protocols (FTP), hypertext transfer protocol (HTTP), and/or other data transfer protocols to receive the data files from the data sources. The data may be in the form of JavaScript object notation (JSON) records, structured query language (SQL) records, and/or so forth.

In some embodiments, the data interface module 214 may perform data integrity tests to verify the integrity of the received data files. In some instances, the data files that are received by the data interface module may contain encrypted data. Accordingly, the data interface module may use an asymmetric or symmetric encryption algorithm to decrypt the data. The data interface module 214 may further merge data from multiple data files, such that the merged data may be fed into other modules for analysis.

The machine learning module 216 may include one or more instructions which, when executed by the one or more processors 204, direct the computing devices 200 to perform operations related to training machine learning models 224 to classify an environment based at least on the user behavior vector 226 and generate filtering values on which the location dataset of that particular environment class needs to be filtered to retain the true location rows and remove the false location rows from the dataset.

The machine learning module 216 may be configured to process training data input, perform feature engineering, and generate machine learning models 224. In one example, the training module 218 of the machine learning module 216 may receive training corpus comprised of one or more input datasets from the data interface module 214 or another data management platform. The training corpus may include training data 228 that emulates data collected from multiple data sources and optionally a set of desired outputs for the training data 228.

For example, the data that is received during the training data input phase may include location data 230 (e.g., GPS coordinates). The training data 228 may further include historical behavior patterns of known user devices that receive telecommunications services from the wireless communication network and/or other wireless communication networks as well as historical behavior patterns of other types of devices that receive telecommunications services from the wireless communication network and/or other wireless communication network. The behavior pattern of a user device may include multiple behavior characteristics of the user device. The behavior patterns may be associated with user behavior vectors 226.

The training module 218 may, during feature engineering, pinpoint features in the training corpus. More specifically, the training module 218 may be configured to identify the significant properties and relationships of the input datasets that aid a model to distinguish between different classes of data. In some aspects, the training module 218 may perform outlier detection analysis, feature composition analysis, and feature relevance analysis during the feature engineering phase. In the outlier detection analysis, the training module 218 may detect outlier features for exclusion from use in the generation of a machine learning model. In various implementations, the outlier detection analysis may be performed using a clustering algorithm, such as a k-means algorithm, a Gaussian mixture algorithm, a bisecting k-means algorithm, a streaming k-means algorithm, or another outlier detection algorithm.

In the feature composition analysis, the training module 218 may transform at least some of the multiple features in the training corpus into a single feature. Accordingly, feature composition may decrease the number of input features while preserving the characteristics of the features. This decrease in the number of features may reduce the noise in the training corpus. As a result, the composition feature that is derived from the multiple features may improve the classification results for the datasets of the training corpus. In various implementations, the feature composition analysis may be performed using various dimensionality reduction algorithms, such as a Singular Value Decomposition (SVD) algorithm, a Principal Component Analysis (PCA) algorithm, or another type of dimensionality reduction algorithm.

For example, the SVD algorithm may break a matrix of the training corpus into linearly independent components. These components may be a set of values that approximate the underlying structure of the original dataset of values independently along each dimension. Due to the relatively small size of the components, many of these components may be ignored to generate an approximation of the training corpus that contains substantially fewer dimensions than the original. In another example, the PCA algorithm may use an orthogonal transformation to emphasize variations in the training corpus to bring out strong patterns in the data sets. The orthogonal transformation is defined in such a way that the first principal component has the largest possible variance, and each succeeding component, in turn, has the highest variance possible under the constraint that it is orthogonal to the preceding components.

In the feature relevance analysis, the training module 218 may identify redundant features in the training corpus to eliminate such features from being used in the training of the machine learning model. An excessive number of features may cause a machine learning algorithm to over-fit a training corpus or slow down the training process. In various implementations, the feature relevance analysis may be performed using a dimensionality reduction algorithm (e.g., the PCA algorithm, a statistics algorithm, and/or so forth). The statistics algorithm may be a summary statistics algorithm, a correlation algorithm, a stratified sampling algorithm, and/or so forth.

The training module 218 may generate machine learning models 224 following the completion of the feature engineering. In this regard, the training module 218 may select an initial type of machine learning algorithm to train a machine learning model using a training corpus. Following the application of a selected machine learning algorithm to the training corpus, the training module 218 may determine a training error measurement of the machine learning model. The training error measurement may indicate the accuracy of the machine learning model in generating a solution. Accordingly, if the training error measurement exceeds a training error threshold, the training module 218 may use a rules engine to select an additional type of machine learning algorithm based on the magnitude of the training error measurement. The training error threshold may be a stabilized error value that is greater than zero. In various embodiments, the rules engine may contain algorithm selection rules that match specific ranges of training error measurement values to specific types of machine learning algorithms.

The different types of machine learning algorithms may include a Bayesian algorithm, a decision tree algorithm, a support vector machine (SVM) algorithm, an ensemble of trees algorithm (e.g., random forests and gradient-boosted trees), an isotonic regression algorithm, and/or so forth. In one example, a classifier (e.g., SVM algorithm) is a function that maps an input attribute factor, $x=(x_1, x_2, x_3, x_4, \ldots x_n)$, to a confidence that the input belongs to a class, that is $f(x)=\text{confidence}(\text{class})$. Search classification may employ a probabilistic and/or statistical based analysis (e.g., factoring into the analysis utilities and costs) to generate the machine learning model. The SVM operates by finding a hypersurface in the space of possible inputs, which hypersurface attempts to split the triggering criteria from the non-triggering events.

In some aspects, reinforcement machine learning algorithms such as Q-learning, State-Action-Reward-State-Action (SARSA), Deep Q Network (DQN), Policy Gradient (PG), Deep Deterministic Policy Gradient (DDPG), and/or other such algorithms may be implemented. For example, using the PG method, the policy $\pi$ has a parameter $\theta$. This π outputs a probability distribution of actions $\pi_{74}$ (a|s)=P [a|s]. The best parameters (θ) may be determined to maximize or optimize a score function $J(\theta)=E_{\pi\theta}[\Sigma\gamma r]$ given the discount factor γ and the reward r.

Following the selection of the additional type of machine learning algorithm, the training module 218 may execute the additional type of machine learning algorithm on the training corpus to generate training results. In some instances, the training module 218 may also supplement the training corpus with additional training datasets before the additional execution. The generated training results are then incorporated by the training module 218 into the machine learning model. Subsequently, the training module 218 may repeat the determination of the training error measurement for the machine learning model, and the selection of one or more types of additional machine learning algorithms to augment the machine learning model with additional training results until the training error measurement is at or below the training error threshold. Accordingly, the training module 218 may use the machine learning algorithms to generate a trained machine learning model. Subsequently, the machine learning module 216 may apply the machine learning model to a behavior pattern of a user device (i.e., user behavior vector). The behavior pattern is determined based at least on a given dataset from the user device, whereby the dataset comprises prediction factors. Upon classifying an environment based at least on the user behavior vector, the machine learning module may 216 filter the cached location dataset and determine the actual location of the user device.

In one aspect, a trained machine learning model may apply a filtering value based at least on the selected environment class at a location. Based at least on the filtering value, the location server may remove the respective location data 230 from the given dataset. For instance, if the machine learning module 216 determines that the distance between location derived from the location data 230 and the actual location of the user device is above a predetermined threshold based at least on the filtering value, the location data 230 is removed from the dataset at the data store 222 or a remote database.

In various embodiments, a trained machine learning model may also calculate a probability value for whether a user device is located at an actual location. In other words, given a behavior pattern (a, b, c) of a user device, a machine learning model function PM (a, b, c) may provide a probability value Ps. The machine learning model may determine that a user device is located at an actual location when the probability value exceeds a probability threshold.

The service selection module 220 may include one or more instructions which, when executed by the one or more processors 204, direct the computing devices 200 to perform operations related to providing telecommunications service offerings and manage rate limiting criteria for the user device based at least on the location of the user device. in one example, the service selection module 220 may modify telecommunications network resources (e.g., network bandwidth) allocated to the user device to effect different QoS. The service selection module 220 may communicate with various network entities to continuously monitor the usage of the telecommunications network resources. In one aspect, the service selection module 220 may be configured to make determinations for offering or limiting services and QoS based at least on the location of the user device. Additionally, the service selection module 220 may be configured to send notifications and alerts to the user device when the network changes would downgrade the QoS or when new service options or change in QoS is available.

Example Processes

Figure 3:
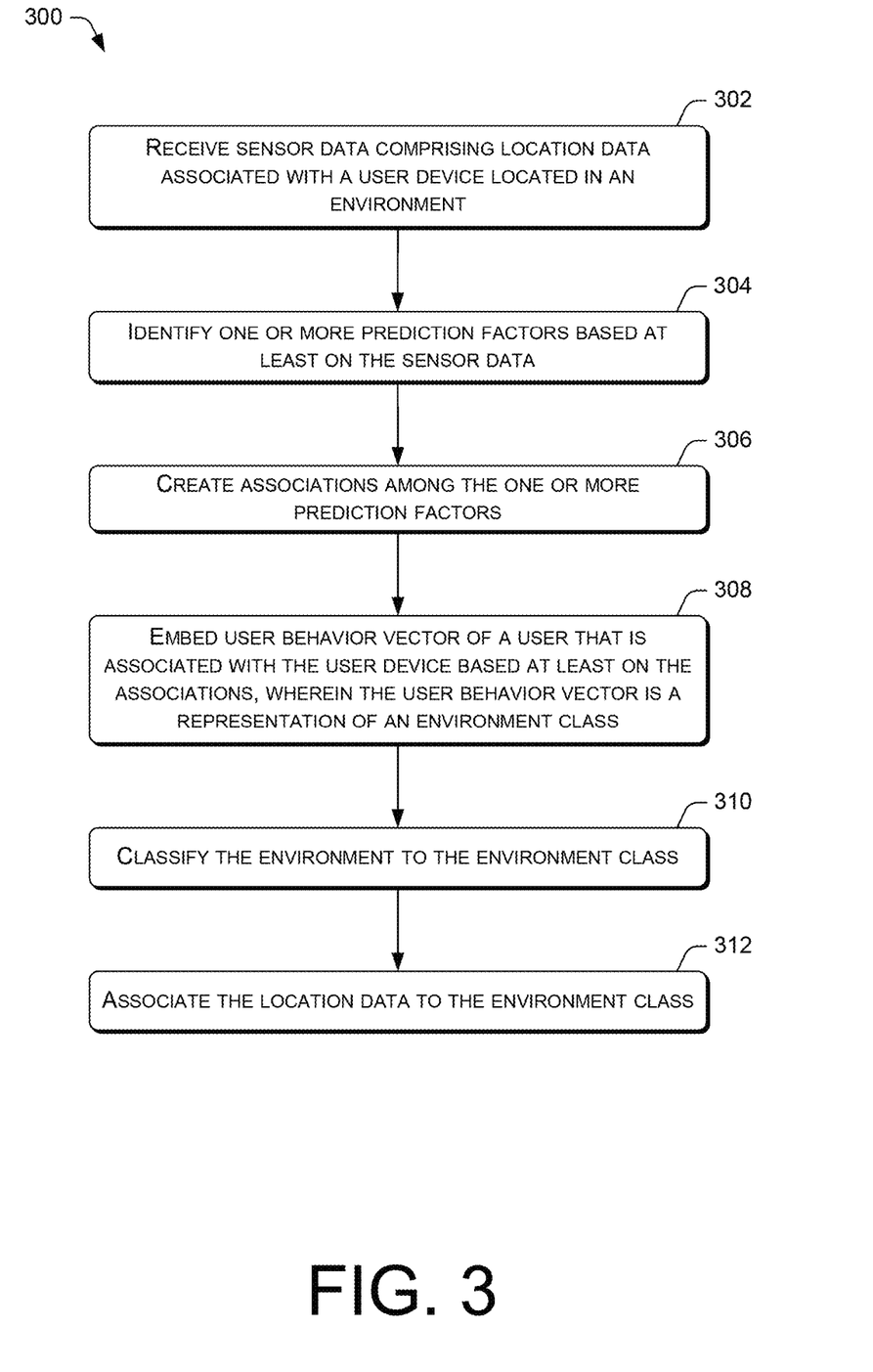
FIG. 3 is a flow diagram of an example process for classifying an environment in which a user device is located.
Figure 4:
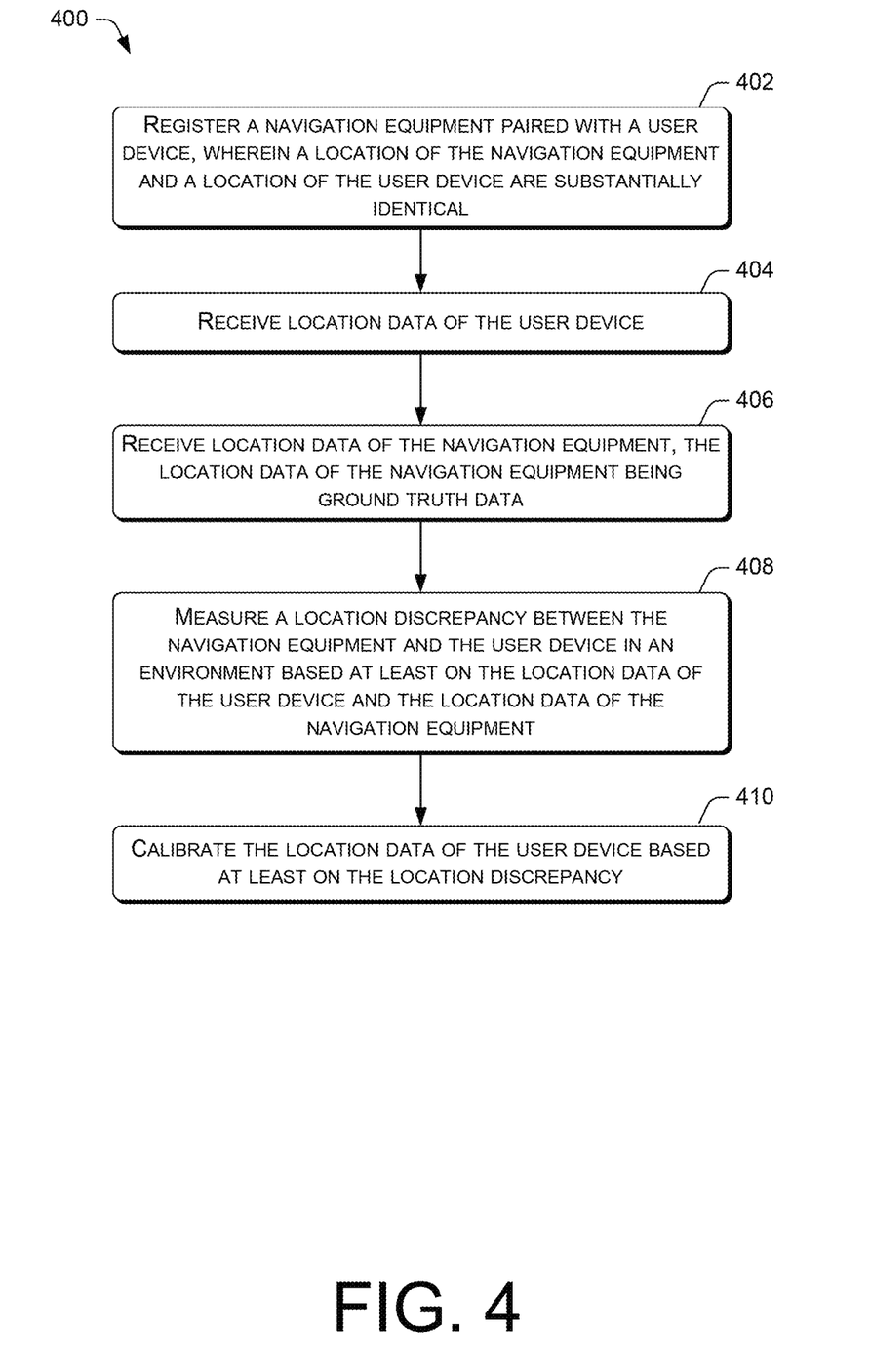
FIG. 4 is a flow diagram of an example process for collecting ground truth data and performing location calibration.
Figure 5:
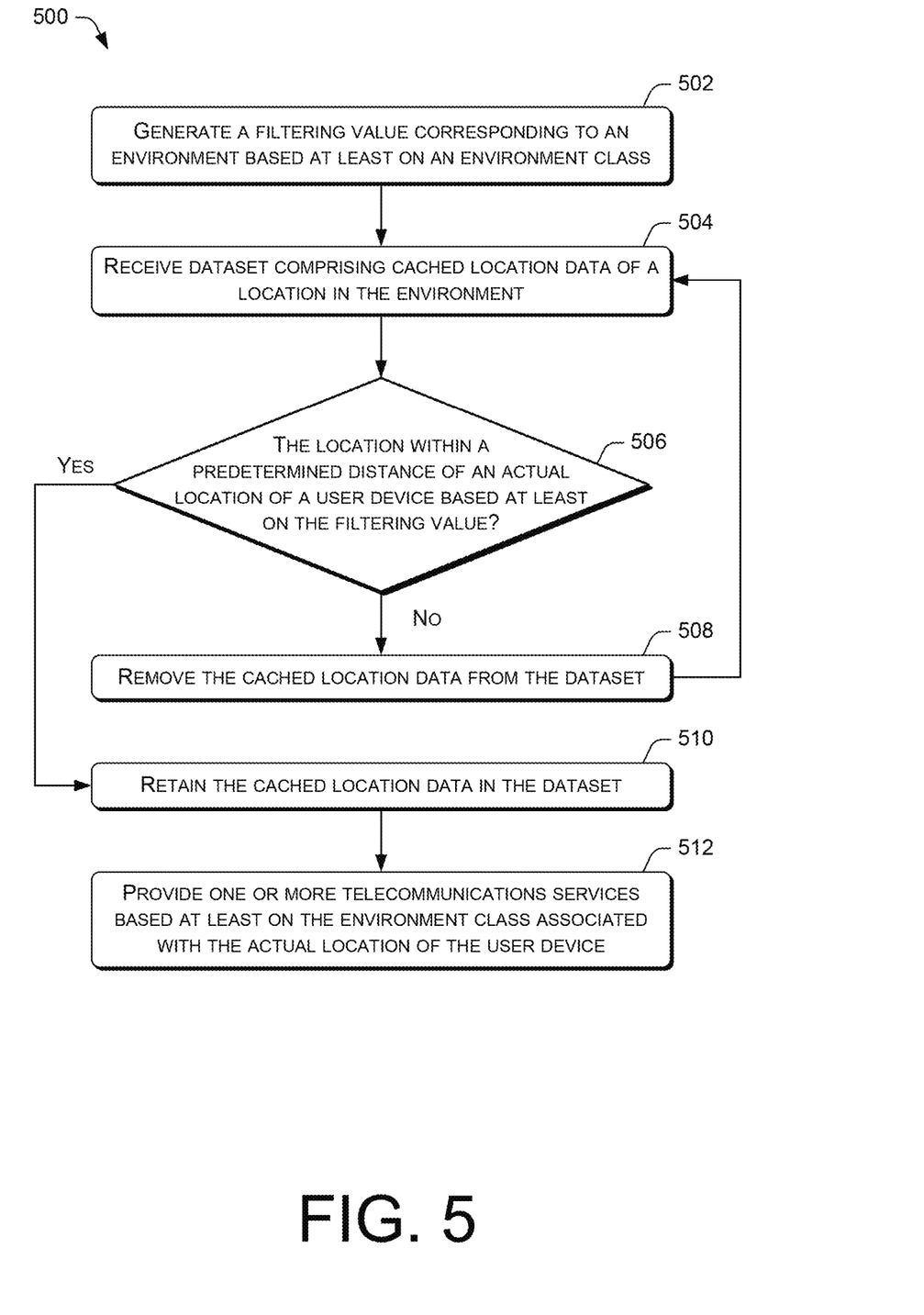
FIG. 5 is a flow diagram of an example process for filtering cached location information from a dataset based at least on a filtering value corresponding to an environment class.

FIGS. 3-5 present illustrative processes 300-500 for classifying an environment and filtering location dataset based at least on the environment classification. The processes 300-500 are illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 300-500 are described with reference to FIGS. 1 and 2.

FIG. 3 is a flow diagram of an example process 300 for classifying an environment to an environment class such as dense urban, office, urban, suburban, and/or other environments. At block 302, a data interface module of a location server receives sensor data comprising location data associated with a user device that is located in an environment. At block 304, a machine learning module of the location server identifies one or more prediction factors (e.g., latitude-longitude coordinates, location age, timestamp) based at least on the sensor data. At block 306, the machine learning module of the location server creates associations among one or more prediction factors. In some aspects, the machine learning module may implement a machine learning module to perform feature engineering on the received sensor data in order to create associations among one or more prediction factors. The associations may be a part of a construct and may correspond with a user behavior vector, which represents user behavior of a user that is associated with the user device. The user behavior vector may be a latent representation of a particular environment class.

At block 308, the machine learning module of the location server embeds a user behavior vector of a user that is associated with the user device based at least on the associations, wherein the user behavior vector is a representation of an environment class. At block 310, the machine learning module of the location server classifies the environment to the environment class based at least on the user behavior vector. In some aspects, the machine learning module may implement a trained machine learning model. The machine learning model may process the user behavior vector resulting from the feature engineering to output an environment class. The environment class may be selected from a plurality of environment classes. The environment class may be selected based at least on determining that the user device is likely located in a location corresponding to the environment class at a time indicated in a timestamp when the location data is generated. At block 312, the machine learning module of the location server may associate the location data to the environment class.

FIG. 4 is a flow diagram of an example process for collecting ground truth data and performing location calibration. At block 402, a location server registers navigation equipment (e.g., GPS) that is paired with a user device, wherein the navigation equipment and the user device are located at the same location in an environment. At block 404, a data interface module of the location server receives, from the user equipment, location data of the user device. Similarly, at block 406, the data interface module of the location server receives, from the navigation equipment, location data of the navigation equipment. The location data received from the navigation equipment is the ground truth data.

At block 408, the location server measures a location discrepancy between the navigation equipment and the user device in the environment based at least on the location data of the user device and the location data of the navigation equipment. The discrepancy measures the accuracy of received location data locations and variance of calibration datasets. At block 410, the location server calibrates the location data of the user device based at least on the location discrepancy.

FIG. 5 is a flow diagram of an example process for filtering cached location information from a dataset based at least on a filtering value corresponding to an environment class. At block 502, a machine learning module of the location server may generate a filtering value corresponding to an environment based at least on the environment class. In some aspects, the filtering values may be computed using an algorithm belonging to the reinforcement learning class that implements a reward and penalty scheme. Various reinforcement learning algorithms such as Q-learning, State-Action-Reward-State-Action (SARSA), Deep Q Network (DQN), Deep Deterministic Policy Gradient (DDPG), and/or other algorithms may be implemented. In one aspect, the machine learning module of the location server may process a number of data points as a reward and determine penalty based on the distance between the location and the actual location.

At block 504, the machine learning module of the location server receives a dataset comprising location data of a location in the environment. At block 506, the machine learning server of the location server determines whether the location is within a predetermined distance of the actual location of the user device based at least on the filtering value. At block 508, the machine learning module of the location server, in response to determining that the location is not within the predetermined distance of the actual location of the user device ("no" from block 506), removes the location data from the dataset.

Subsequently, the machine learning module of the location server may receive an additional dataset comprising location data and the process may continue. Additionally, or alternatively, the machine learning module of the location server may determine that the location is within the predetermined distance of the actual location of the user device based at least on the filtering value ("yes" from block 506). In this scenario, the machine learning module of the location server may retain the location data in the dataset, as indicated in block 510. At block 512, a service selection module of the location server may provide one or more telecommunications services based at least on the location of the user device.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors configured to perform acts comprising:
    maintaining a location dataset comprising cached location data of a location in an environment associated with an environment class;
    receiving sensor data comprising location data associated with a user device located in the environment;
    identifying one or more prediction factors from a user behavior pattern of a user associated with the user device in the environment, based at least on the sensor data;
    creating associations among the one or more prediction factors based on feature engineering on the sensor data;
    deriving a user behavior vector of the user based on the created associations, wherein the user behavior vector is a representation of an environment class;
    embedding the user behavior vector;
    classifying the environment to the environment class based on the user behavior vector;
    associating the location data to the environment class;
    determining an actual location of the user device based at least on the environment classification;
    filtering the location dataset to remove false location data, including:
        generating a filtering value corresponding to the environment based on the environment class;
        determining whether the location is within a predetermined distance of an actual location of the user device based at least on the filtering value; and
        in response to determining that the location is not within the predetermined distance of the actual location of the user device, removing the cached location data from the location dataset; and
    providing one or more telecommunications services based at least on the environment class associated with the actual location of the user device.

2. The one or more non-transitory computer-readable media of claim 1, wherein the acts further comprise:
    registering navigation equipment that is paired with the user device, wherein a location of the navigation equipment and a location of the user device are substantially identical in the environment;
    receiving location data of the user device;
    receiving location data of the navigation equipment, the location data of the navigation equipment being ground truth data;
    determining a location discrepancy between the navigation equipment and the user device based at least on the location data of the user device and the ground truth data; and
    calibrating the location data of the user device based at least on the location discrepancy.

3. The one or more non-transitory computer-readable media of claim 1, wherein the acts further comprise:
    in response to determining that the location is within the predetermined distance of the actual location of the user device, retaining the cached location data from the dataset.

4. The one or more non-transitory computer-readable media of claim 3, wherein the acts further comprise:
    providing one or more telecommunications services based at least on the environment class associated with the actual location of the user device.

5. The one or more non-transitory computer-readable media of claim 1, wherein the one or more prediction factors comprise latitude-longitude coordinates, location age, and timestamp.

6. The one or more non-transitory computer-readable media of claim 1, wherein the environment class comprises an indoor environment, an outdoor urban environment, an outdoor suburban environment, or an outdoor rural environment.

7. The one or more non-transitory computer-readable media of claim 1, wherein the user device comprises one or more environmental sensors.

8. A computer-implemented method, comprising:
   maintaining a location dataset comprising cached location data of a location in an environment associated with an environment class;
   receiving sensor data comprising location data associated with a user device located in the environment;
   identifying one or more prediction factors from a user behavior pattern of a user associated with the user device in the environment, based at least on the sensor data;
   creating associations among the one or more prediction factors based on feature engineering on the sensor data;
   deriving a user behavior vector of the user based on the created associations, wherein the user behavior vector is a representation of an environment;
   embedding the user behavior vector;
   classifying the environment to the environment class based on the user behavior vector;
   associating the location data to the environment class;
   determining an actual location of the user device based at least on the environment classification;
   filtering the location dataset to remove false location data, including:
      generating a filtering value corresponding to the environment based on the environment class;
      determining whether the location is within a predetermined distance of an actual location of the user device based at least on the filtering value; and
      in response to determining that the location is not within the predetermined distance of the actual location of the user device, removing the cached location data from the location dataset; and
   providing one or more telecommunications services based at least on the environment class associated with the actual location of the user device.

9. The computer-implemented method of claim 8, further comprising:
   registering navigation equipment that is paired with the user device, wherein a location of the navigation equipment and a location of the user device are substantially identical in the environment;
   receiving location data of the user device;
   receiving location data of the navigation equipment, the location data of the navigation equipment being ground truth data;
   determining a location discrepancy between the navigation equipment and the user device based at least on the location data of the user device and the ground truth data; and
   calibrating the location data of the user device based at least on the location discrepancy.

10. The computer-implemented method of claim 8, further comprising:
    in response to determining that the location is within the predetermined distance of the actual location of the user device, retaining the cached location data from the dataset.

11. The computer-implemented method of claim 10, further comprising:
    providing one or more telecommunications services based at least on the environment class associated with the actual location of the user device.

12. The computer-implemented method of claim 8, wherein the one or more prediction factors comprise latitude-longitude coordinates, location age, and timestamp.

13. The computer-implemented method of claim 8, wherein the environment class comprises an indoor environment, an outdoor urban environment, an outdoor suburban environment, or an outdoor rural environment.

14. The computer-implemented method of claim 8, wherein the user device comprises one or more environmental sensors.

15. A system, comprising:
    one or more non-transitory storage mediums configured to provide stored computer-readable instructions, the one or more non-transitory storage mediums coupled to one or more processors, the one or more processors configured to execute the computer-readable instructions to cause the one or more processors to:
    maintain a location dataset comprising cached location data of a location in an environment associated with an environment class;
    receive sensor data comprising location data associated with a user device located in the environment;
    identify one or more prediction factors from a user behavior pattern of a user associated with the user device in the environment, based at least on the sensor data;
    create associations among the one or more prediction factors based on feature engineering on the sensor data;
    derive a user behavior vector of the user based on the created associations, wherein the user behavior vector is a representation of an environment class;
    embed the user behavior vector;
    classify the environment to the environment class;
    associate the location data to the environment class;
    determine an actual location of the user device based at least on the environment classification;
    filter the location dataset to remove false location data, including:
       generate a filtering value corresponding to the environment based on the environment class;
       determine whether the location is within a predetermined distance of an actual location of the user device based at least on the filtering value; and
       in response to determining that the location is not within the predetermined distance of the actual location of the user device, removing the cached location data from the location dataset; and
    provide one or more telecommunications services based at least on the environment class associated with the actual location of the user device.

16. The system of claim 15, wherein the one or more processors are further configured to:
    registering navigation equipment that is paired with the user device, wherein a location of the navigation equipment and a location of the user device are substantially identical in the environment;
    receiving location data of the user device;

receiving location data of the navigation equipment, the location data of the navigation equipment being ground truth data;

determining a location discrepancy between the navigation equipment and the user device based at least on the location data of the user device and the ground truth data; and calibrating the location data of the user device based at least on the location discrepancy.

17. The system of claim 15, wherein the one or more processors are further configured to:

in response to determining that the location is within the predetermined distance of the actual location of the user device, retain the cached location data from the dataset.

* * * * *